United States Patent [19]
Kitagawa et al.

[11] 3,876,732
[45] Apr. 8, 1975

[54] POLYCHLOROPRENE ELASTOMER

[75] Inventors: Chojiro Kitagawa; Ichiro Fukuoka, both of Tokyo; Takashi Kadowaki, Niigata; Shoji Kimura; Takehiko Nishimura, both of Tokyo; Kanehisa Hanabusa, Niigata, all of Japan

[73] Assignee: Denki Kagaku Kogyo Kabushiki Kaisha, Tokyo, Japan

[22] Filed: Sept. 18, 1972

[21] Appl. No.: 289,915

Related U.S. Application Data

[62] Division of Ser. No. 753,765, Aug., 1968, Pat. No. 3,714,296.

[52] U.S. Cl. ...... 260/890; 260/29.7 D; 260/33.6 A; 260/78.5 BB; 260/78.5 UA; 260/79.3 M; 260/82.1; 260/83.5; 260/83.7; 260/92.3; 260/891
[51] Int. Cl. ............................................. C08f 29/12
[58] Field of Search ................................... 260/890

[56] References Cited
UNITED STATES PATENTS
3,714,296   1/1973   Kitagawa et al. ................... 260/890

*Primary Examiner*—Murray Tillman
*Assistant Examiner*—J. Ziegler
*Attorney, Agent, or Firm*—Sughrue, Rothwell, Mion, Zinn & Macpeak

[57] ABSTRACT

A process is disclosed for preparing a polychloroprene elastomer consisting of a blend of from 20 to 80 parts by weight of (a) a toluene-insoluble gel polymer and from 80 to 20 parts by weight of (b) a toluene-soluble sol polymer, the process comprising preparing the toluene-insoluble gel polymer by polymerizing chloroprene or a mixture of chloroprene with a small amount of at least one copolymerizable monomer in the presence of a suitable cross-linking agent, preparing the toluene-soluble sol polymer by polymerizing chloroprene or a mixture of chloroprene with a small amount of at least one copolymerizable monomer and blending the gel and sol polymers wherein an improved elastomer is obtained by polymerizing the toluene-insoluble gel polymer to a cross-linking density of at least $2.4 \times 10^{-6}$ to a monomer conversion of at least 80%.

9 Claims, No Drawings

POLYCHLOROPRENE ELASTOMER

This is a division of application Ser. No. 753,765, filed Aug. 19, 1968, now U.S. Pat. No. 3,714,296.

BACKGROUND OF THE INVENTION

1. Field of the Invention

This invention relates to a polychloroprene elastomer having excellent extrusion and molding properties.

2. Description of the Prior Art

The term "polychloroprene elastomer" or "chloroprene" as used herein refers to polymers of 2-chloro-1,3-butadiene or copolymers of 2-chloro-1,3-butadiene with one or moe copolymerizable monomers.

Ordinary polychloroprene elastomers do not possess satisfactory processability characteristics especially for extrusion molding processes. Generally, it is not characterized by reduced die swell on extrusion through the rolls of the extrusion machines, by resistance to deformation, by smoothness of surface of extruded products, high velocity of extrusion and other factors as would be desirable. Accordingly, it is difficult to fabricate polychloroprene elastomers into shaped articles having complicated contours with any degree of precision by extrusion or by calendering. That is to say, that when manufacturing extruded products having a complicated figure and some resiliency, certain defects appear, namely, deformation, dimension changes, surface roughness, edge napping and the like.

It is an object of the present invention to provide a polychloroprene elastomer which is free from such defects and which is characterized by an improved processability, and excellent extrusion and molding properties. In more detail, the object of the present invention is to provide a polychloroprene elastomer which has excellent extrusion and molding properties as well as other improved processing properties such that it can be fabricated at a high extrusion rate into a smooth-surfaced extruded product which is free from any deformation or warp even though the product has a complicated cross-section.

SUMMARY OF THE INVENTION

The present invention comprises preparing a polychloroprene elastomer by blending a crosslinked toluene-insoluble gel-like polychloroprene (hereinafter referred to as the "gel polymer"), obtained by polymerizing chloroprene in the presence of a crosslinking agent, with a toluene-soluble sol-like polychloroprene (hereinafter referred to as "sol polymer"), obtained by ordinary polymerization procedures.

DETAILED DESCRIPTION OF PREFERRED EMBODIMENTS

The excellent extrusion qualities of the elastomer of the present invention are attributable to the intimate admixture of a crosslinked toluene insoluble gel polychloroprene with a toluene-soluble sol polychloroprene. Generally, it is necessary to blend the gel polymer and sol polymer in the weight ratio of from 20:80 to 80:20. Incorporation of the sol polymer in a proportion which exceeds the above range will result in an increased die swelling and deformation of the extruded product. On the other hand, incorporation in a lesser amount will result in unsatisfactory surface smoothness and a reduced flow property of the resulting elastomer and, consequently, a decreased extrusion rate.

The gel polymer suitably used in the practice of the present invention may be obtained by polymerizing chloroprene or a mixture of chloroprene with one or more comonomers in the presence of a bifunctional crosslinking agent such as glycol dimethacrylates of the formula

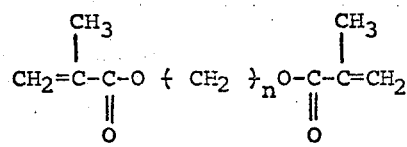

wherein $n$ is an integer of from 1 to 8, or

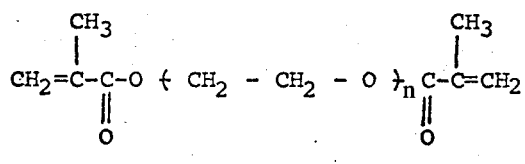

wherein $n$ is an integer of from 2 to 4. Examples of suitable crosslinking agents include ethylene glycol dimethacrylate (EDMA), trimethylene glycol dimethacrylate, tetramethylene glycol dimethacrylate (TDMA), diethylene glycol dimethacrylate (DEDMA), triethylene glycol dimethacrylate, tetraethylene glycol dimethacrylate (TEDMA) and the like; and divinylbenzene, divinyl ether, diallyl phthalate, divinylsulfone and the like. The excellent extrusion and molding properties of the elastomer of the present invention are obtainable by the use of a highly crosslinked gel polymer having a crosslinking density of at least $2.4 \times 10^{-6}$. If the density is less than $2.4 \times 10^{-6}$, the die swelling on extrusion will increase, the extrusion rate will decrease, the surface smoothness of the extruded product will be lost and, thus, the material will be poorly extruded. The crosslinking density of gel polymer depends on the type and quantity of crosslinking agent used, the degree of monomer to polymer conversion and other factors, and, therefore, the desired value is obtainable by properly adjusting these factors.

The swelling index and crosslinking density of the crosslinked gel polymer are determined in the following manner: The weight Wa of a sample is weighed by means of a chemical balance and the sample is soaked in about 100 cc of toluene contained in a stoppered 100 cc measuring flask. The container is allowed to stand in a thermostat controlled bath of 30°C. After reaching swelling equilibrium, the sample is removed from the toluene, lightly wiped with filter paper, and quickly weighed. The weight (WB) after swelling was noted and the swelling index (Q) was calculated by the equation $$Q = \left(\frac{Wa}{Wb} - 1\right)\left(\frac{P_1}{P_2}\right)$$

where $P_1$ is the density (g/cc) of gel chloroprene, $P_2$ is the density (g/cc) of toluene. The crosslinking density $\gamma$ is calculated from the value of swelling index by the P. J. Flory and A. M. Bueche's equation $$\gamma s = \frac{2.303 \log(1-V_2) V_2}{2V_1 P_1 (V_2^{1/3} - V_2/2)}$$

$$V_2 = \frac{1}{1 + (W_b/W_a - 1)(P_1/P_2)}$$

where $V_1$ is the volume fraction of solvent toluene, $V_2$ is the volume fraction of polychloroprene in the swollen gel and $\mu$ is interaction coefficient between polychloroprene and solvent.

The sol polymer used in the present invention may be obtained by polymerizing chloroprene or a mixture of chloroprene with small amounts of one or more copolymerizable monomers in the presence of an aliphatic mercaptan such as n-dodecylmercaptan. The resulting polymer is substantially gel-free and has a Mooney viscosity ($ML_{1+4}$) at 100°C. of at least 15.

In the present invention there may be used as a co-monomer copolymerizable with chloroprene, e.g., styrene, vinyltoluene, butadiene, isoprene 2,3-dichlorobutadiene-1,3, methyl vinyl ketone, methyl acrylate, ethyl acrylate, methyl methacrylate, ethyl methacrylate, and acrylonitrile.

The gel polymer and sol polymer thus obtained are blended in the form of a latex in the proportion as mentioned above and the mixture is isolated by freeze coagulation or by similar conventional techniques or by drum drying to obtain a polychloroprene elastomer having a Mooney viscosity ($ML_{1+4}$) at 100°C. of 30 to 70, preferably of 40 to 60.

The chloroprene elastomer thus obtained is thixotropic namely, when the elastomer is directly dissolved in benzene only the sol component dissolves and the gel component remains undissolved, when the elastomer is dissolved in benzene after mastication on a roll it dissolves entirely providing a turbid benzene solution which insolubilizes again after a few hours when allowed to stand still at room temperature. The gel polymer by itself is not solubilized by mastication, and this is a peculiar property obtained by blending with a low molecular sol polymer. All gel polymers do not exhibit such property when blended with a sol polymer, for instance, a gel polymer prepared by treating a chloroprene rubber with a peroxide will not exhibit such property.

The greatest characteristic of the rubber obtained by blending a gel polymer with a sol polymer in accordance with the present invention is the thixotropic property as mentioned above. It seems that the excellent extrusion molding property is attributable to this peculiar property since the low molecular sol polymer acts as a plasticizer on extrusion and the thixotropic gel polymer acts to prevent deformation, shrinkage and swelling. As a result of the interaction of the two polymers, the elastomer of the present invention exhibits good flow properties and good processability on extrusion and provides a good extruded product having a reduced deformation and die swelling tendency.

The present invention will now be illustrated by the following example which is not intended to be limiting in any manner. All parts are by weight.

EXAMPLE

A. Preparation of sol polymer:

A polymerization mixture of the following recipe was charged into a stirred jacketed polymerization vessel and gradually heated, with stirring, to 40°C. over a period of one hour. A mixed aqueous solution of 0.25% of potassium persulfate and 0.025% of sodium anthraquinone-$\beta$-sulfonate was added to the mixture as a polymerization catalyst. Polymerization was continued to a predetermined conversion.

| | |
|---|---|
| Chloroprene | 95–100 (parts) |
| Other monomer | 5–0 |
| Disproportionated rosin | 4 |
| n-Dodecylmercaptan | 0.3 |
| Formaldehyde-sodium naphthalene sulfonate condensation product | 0.8 |
| Sodium hydroxide | 0.8 |
| Water | 150 |

The reaction was stopped by the addition of an emulsion containing 0.03% of phenothiazine and 0.03% of tert-butylcatechol. Unreacted chloroprene was then eliminated at 60°C. under an absolute pressure of 180 mm. Hg. Thus, there was obtained a toluene-soluble polychloroprene latex.

B. Preparation of the gel polymer:

A polymerization mixture as follows was polymerized in a stirred, jacketed polymerization vessel to a predetermined conversion and post-treated in the similar manner as in the preparation of the sol polymer.

| | |
|---|---|
| Chloroprene | 98–100 (parts) |
| Other monomer | 2–0 |
| Disproportionated rosin | 3.5 |
| n-Dodecylmercaptan | 0.2–0.35 |
| Formaldehyde-sodium naphthalene sulfonate condensation product | 0.8 |
| Sodium hydroxide | 0.8 |
| Crosslinking agent | 3–7 |
| Water | 150 |

C. Blend of sol polymer and gel polymer:

The sol polymer latex and gel polymer latex thus obtained were mixed together in a latex state to a predetermined proportion, coagulated on the surface of a rotary drum through which was circulated a brine at a temperature of −20° to −10°C. The resulting film was washed with water and dried at 100°C. to 150°C. to obtain a blend. The polymer blend thus obtained was compounded in accordance with the following recipe.

| | |
|---|---|
| Polymer blend | 100 (parts) |
| Phenyl-$\alpha$-naphthylamine | 1.0 |
| Magnesium oxide | 4.0 |
| Zinc oxide | 5.0 |
| 2-Mercaptoimidazoline | 0.35 |

The compound thus formed was extruded by means of a Koka-type flow tester and, thereby, the extrusion rate and the die swelling (ratio of the average outer diameter of the extruded product to the diameter of the extrusion die) were measured. The results were summarized in Table 1.

The test conditions by the Koka-type flow tester were as follows:

| | | |
|---|---|---|
| Die | 1.0 mm φ × 1.0 mm | |
| Load | 60 Kg/cm² | |
| Temperature | 100°C. | |

For comparison, a gel polymer of crosslinking density of $0.6 \times 10^{-6}$ was obtained in the same manner as in the specimen E-9 in the Table 1, except that polymerization was stopped at a conversion of 70% and was subjected to the same test. In this case, the extrusion rate was $9.4 \times 10^{-3}$ cc/sec., the die swelling was 2.05. The resulting surface smoothness was poor.

wherein $n$ is an integer of from 1 to 8,

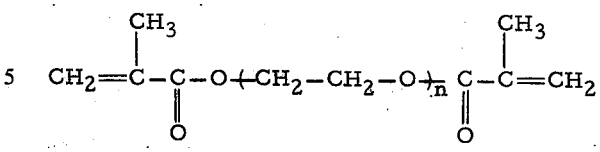

wherein $n$ is an integer of from 2 to 4, divinylbenzene and diallyl phthalate, preparing said toluene-soluble sol

TABLE 1

| | E-1 | 2 | 3 | 4 | 5 | 6 | 7 | 8 | E-9 | 10 | 11 | 12 |
|---|---|---|---|---|---|---|---|---|---|---|---|---|
| Sol polymer Gel polymer: | | | | | | | | | | | | |
| Crosslinking agent | EDMA, 3.0 | EDMA, 5.0 | EDMA, 7.0 | EDMA, 4.0 | EDMA, 4.5 | TDMA, 5.0 | DEDMA, 4.0 | TEDMA, 5.0 | DVB, 5.0 | DVB, 5.0 | DVB, 5.0 | DAP, 7.0 |
| Monomer composition | CP | CP | CP | CP98, 2, 3; DC-BD, 2. | CP | CP | CP | CP | CP | CP | CP | CP. |
| n-Dodecylmercaptan | 0.2 | 0.3 | 0.35 | 0.25 | 0.25 | 0.25 | 0.25 | 0.25 | 0.3 | 0.3 | 0.3 | 0.3. |
| Conversion | 90 | 98 | 97 | 93 | 90 | 91 | 95 | 93 | 80 | 90 | 95 | 80. |
| Crosslinking density ×10⁶ | 10.7 | 25.0 | 31.3 | 13.5 | 14.6 | 17.2 | 30.4 | 22.7 | 2.4 | 8.2 | 22.0 | 4.2. |
| Monomer composition | CP | CP | CP | CP | CP, 95; St, 5. | CP | CP | CP | CP | CP | CP | CP. |
| Mooney viscosity ML₁₊₄ (100° C.) | 25.5 | 22.5 | 20.0 | 24.5 | 23.0 | 23.0 | 21.0 | 23.0 | 23.0 | 22.5 | 24.5 | 21.0. |
| Gel polymer/sol polymer blend ratio | 54/46 | 52/48 | 51/49 | 54/46 | 53/47 | 54/46 | 52/48 | 54/46 | 50/50 | 50/50 | 50/50 | 50/50. |
| Mooney viscosity of blend ML₁₊₄ (100° C.) | 48.5 | 49.5 | 51.5 | 50.5 | 51.5 | 49.0 | 48.5 | 51.0 | 49.0 | 50.5 | 48.5 | 51.0. |
| Compound: | | | | | | | | | | | | |
| Extrusion rate, cc./sec. (×10³) | 28.2 | 39.8 | 37.1 | 31.4 | 37.5 | 35.3 | 36.1 | 35.4 | 20.0 | 27.0 | 28.9 | 24.5. |
| Die swelling | 1.27 | 1.07 | 1.05 | 1.20 | 1.26 | 1.13 | 1.12 | 1.18 | 1.60 | 1.35 | 1.10 | 1.52. |
| Surface smoothness | Exc | Exc | Exc | Exc | Exc | Exc | Exc | Exc | Good | Exc | Exc | Exc. |

Notes:

| | |
|---|---|
| DVB: | Divinylbenzene |
| DAP: | Diallyl phthalate |
| EDMA: | Ethylene glycol dimethacrylate |
| TDMA: | Tetramethylene glycol dimethacrylate |
| DEDMA: | Diethylene glycol dimethacrylate |
| TEDMA: | Tetraethylene glycol dimethacrylate |
| CP: | Chloroprene |
| 2.3DCBD: | 2,3-dichlorobutadiene-1,3 |
| St: | Styrene |

As evident from the Table 1, polychloroprene elastomers prepared using a gel polymer having a density of crosslinking of at least $2.4 \times 10^{-6}$ are extrudable at high extrusion rates without difficulty. The extruded product is characterized by a smooth surface. The elastomer prepared using a gel polymer of a crosslinking density of $0.6 \times 10^{-6}$, which is outside the scope of the present invention, has poor extrusion characteristics.

What is claimed is:

1. In a process for preparing a polychloroprene elastomer consisting of a blend of from 20 to 80 parts by weight of (a) a toluene-insoluble gel polymer and from 80 to 20 parts by weight of (b) a toluene-soluble sol polymer comprising preparing said toluene-insoluble gel polymer by polymerizing chloroprene or a mixture of chloroprene with a small amount of at least one copolymerizable monomer in the presence of a cross-linking agent selected from the group consisting of a compound represented by the following formula:

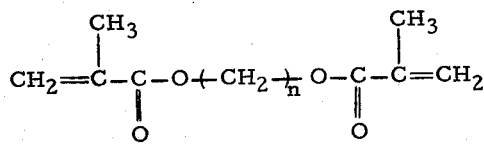

polymer by polymerizing chloroprene or a mixture of chloroprene with a small amount of at least one copolymerizable monomer, and blending said toluene-insoluble gel polymer and said toluene-soluble sol polymer, the improvement comprising polymerizing said toluene-insoluble gel polymer to a cross-linking density of at least $2.4 \times 10^{-6}$ and a monomer conversion of at least 80%.

2. The process of claim 1 wherein the cross-linking agent is ethylene glycol dimethacrylate, tetramethylene glycol dimethacrylate, diethylene glycol dimethacrylate or tetraethylene glycol dimethacrylate.

3. The process of claim 1 wherein the monomer copolymerizable with chloroprene is a monomer selected from the group consisting of styrene, vinyltoluene, butadiene, isoprene, 2,3-dichlorobutadiene-1,3, methyl vinyl ketone, methyl acrylate, ethyl acrylate, methyl methacrylate, ethyl methacrylate and acrylonitrile.

4. The process of claim 1 wherein the monomer copolymerizable with chloroprene is styrene.

5. The process of claim 1 wherein the monomer copolymerizable with chloroprene is 2,3-dichlorobutadiene-1,3.

6. The process of claim 1 wherein the weight ratio of said gel polymer to said sol polymer varies from 50:50 to 54:46.

7. The process of claim 1 wherein the Mooney viscosity (ML₁₊ ₄) at 100°C. of the blend varies from 30 to 70.

8. In a process for preparing a polychloroprene elastomer consisting of a blend of from 20 to 80 parts by weight of (a) a toluene-insoluble gel polymer and from 80 to 20 parts by weight of (b) a toluene-soluble sol polymer comprising preparing said toluene-insoluble gel polymer by polymerizing chloroprene or a mixture of chloroprene with a small amount of at least one copolymerizable monomer in the presence of a cross-linking agent selected from the group consisting of a compound represented by the following formula:

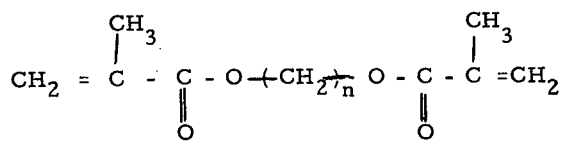

wherein $n$ is an integer of from 1 to 8, divinylbenzene and diallyl phthalate, preparing said toluene-soluble sol polymer by polymerizing chloroprene or a mixture of chloroprene with a small amount of at least one copolymerizable monomer, and blending said toluene-insoluble gel polymer and said toluene-soluble sol polymer, the improvement comprising polymerizing said toluene-insoluble gel polymer to a cross-linking density of at least $2.4 \times 10^{-6}$ and a monomer conversion of at least 80%.

9. In a process for preparing a polychloroprene elastomer consisting of a blend of from 20 to 80 parts by weight of (a) a toluene-insoluble gel polymer and from 80 to 20 parts by weight of (b) a toluene-soluble sol polymer comprising preparing said toluene-insoluble gel polymer by polymerizing chloroprene or a mixture of chloroprene with a small amount of at least one copolymerizable monomer in the presence of a cross-linking agent selected from the group consisting of a compound represented by the following formula:

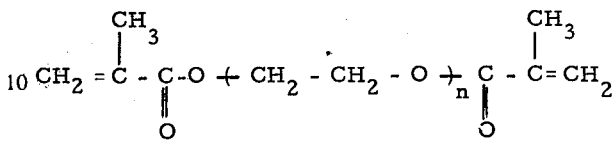

wherein $n$ is an integer of from 2 to 4, divinylbenzene and diallyl phthalate, preparing said toluene-soluble sol polymer by polymerizing chloroprene or a mixture of chloroprene with a small amount of at least one copolymerizable monomer, and blending said toluene-insoluble gel polymer and said toluene-soluble sol polymer, the improvements comprising polymerizing said toluene-insoluble gel polymer to a cross-linking density of at least $2.4 \times 10^{-6}$ and a monomer conversion of at least 80%.

* * * * *